United States Patent [19]

Almond et al.

[11] Patent Number: 5,050,582

[45] Date of Patent: Sep. 24, 1991

[54] FLUID HEATING APPARATUS AND PROCESS PARTICULARLY SUITABLE FOR A DEEP FAT FRYER

[75] Inventors: James Almond, Mountain Home; Wayne Wooldridge, Gassville; Robert E. Davis; Ralph Wooldridge, both of Mountain Home, all of Ark.

[73] Assignee: Arkansas Patents, Inc., Mountain Home, Ark.

[21] Appl. No.: 556,747

[22] Filed: Jul. 23, 1990

[51] Int. Cl.⁵ .............................................. F24D 1/00
[52] U.S. Cl. ................................... 126/391; 126/375; 99/403
[58] Field of Search ................... 126/369, 91 R, 369.1, 126/367, 366, 368, 91 A; 99/403, 410, 446, 444, 447, 340; 165/177

[56] References Cited

U.S. PATENT DOCUMENTS

| | | | |
|---|---|---|---|
| 2,712,308 | 7/1955 | Keating | 126/391 |
| 4,637,792 | 1/1987 | Davis | 431/1 |
| 4,651,712 | 3/1987 | Davis | 126/110 R |
| 4,690,127 | 9/1987 | Sank | 126/391 |
| 4,751,915 | 6/1988 | Price | 126/391 |
| 4,780,076 | 10/1988 | Davis | 431/1 |
| 4,848,318 | 7/1989 | Brewer | 126/390 |
| 4,898,151 | 2/1990 | Luebke et al. | 126/391 |
| 4,905,664 | 3/1990 | Dunham | 126/391 |
| 4,913,041 | 4/1990 | Taber et al. | 126/391 |

*Primary Examiner*—James C. Yeung
*Attorney, Agent, or Firm*—Thomas W. Speckman; Douglas H. Pauley

[57] ABSTRACT

A process and apparatus for heating fluids, particularly for heating cooking oil within a deep fat fryer. A fuel-air mixture is introduced and combusted within a combustion tube, preferably of either a power burner or a pulse combustor. The flue gases are discharged from the combustion tube, into a plenum. A baffle arrangement is used to direct the flue gases from the plenum through a passageway, creating flue gas flow in one direction over a primary portion of an outer surface of the fluid container, and then in a counterflow direction over a secondary portion of the outer surface of the fluid container. The flue gases are then discharged from the passageway into a flue stack. According to the process and apparatus of this invention, flue gas temperatures are reduced to about 200° F.–400° F., nitrogen oxides can be reduced to 10 ppm or lower, carbon monoxide is reduced to 4 ppm or lower, and the overall thermal efficiency of the fluid heater is increased to approximately 80–85 percent.

13 Claims, 7 Drawing Sheets

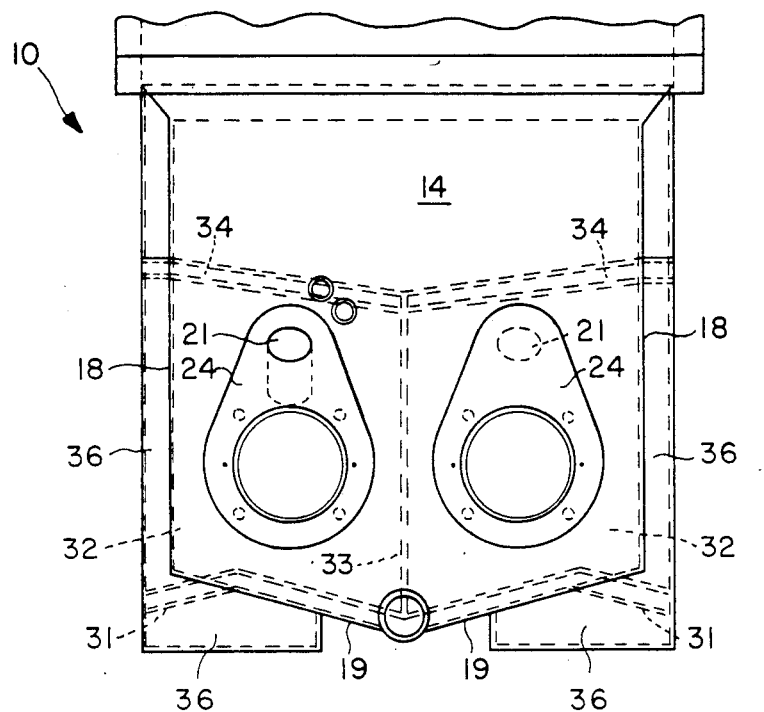
FIG. 4
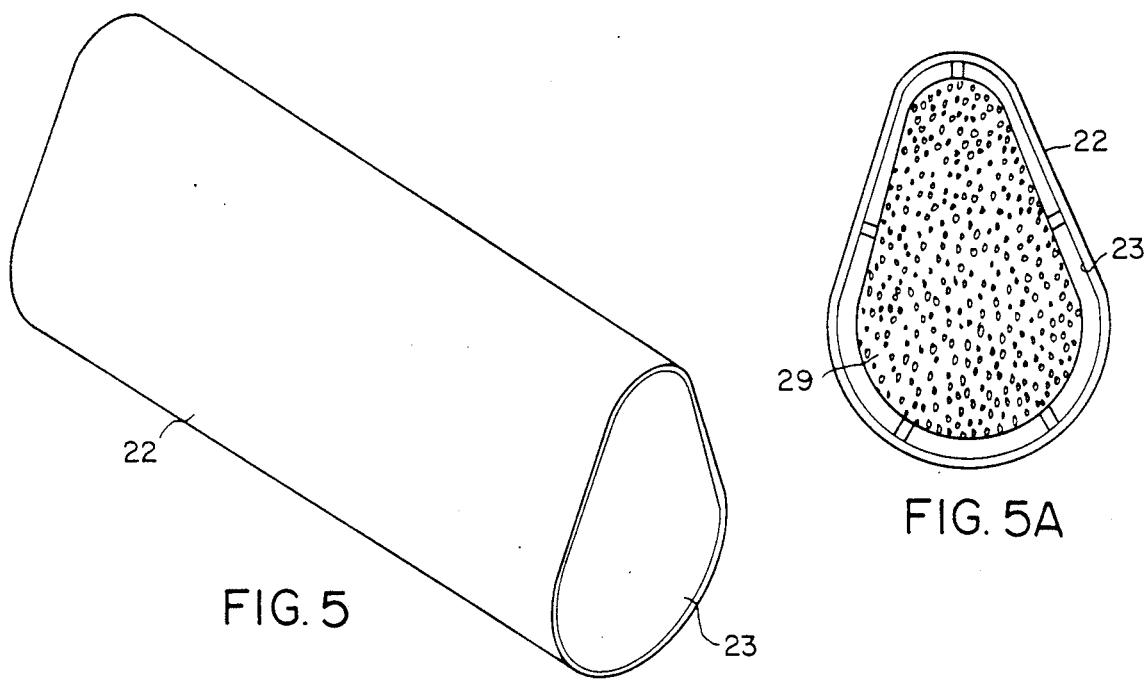
FIG. 5
FIG. 5A

FLUID HEATING APPARATUS AND PROCESS PARTICULARLY SUITABLE FOR A DEEP FAT FRYER

BACKGROUND OF THE INVENTION

1. Field of the Invention

This invention relates to a fluid heating apparatus which provides increased overall thermal efficiency by using a baffle arrangement to direct flue gas flow about a rear wall, side walls and a bottom wall of a fluid container.

2. Description of Prior Art

Conventional heating apparatuses and processes for deep fat fryers operate at an overall thermal efficiency of about 40 percent. The exhaust or flue gases of such conventional apparatuses and processes operate at approximately 1300° F., and include nitrogen oxide emissions of approximately 70 ppm. Many conventional deep fat fryers operate with an open flame positioned directly beneath the fluid container. Such apparatuses are extremely dangerous and relatively inefficient.

U.S. Pat. No. 4,898,151 discloses a fuel-fired deep fat frypot in which exhaust gases are recirculated around the frypot. A squirrel cage type centrifugal fan is used to draw ambient air and gas through a burner and into a combustion chamber. Relatively hot combustion gases are discharged into an inlet chamber. The combustion gases flow rearwardly through side heating passages which are defined by an insulation structure. The combustion gases continue to flow into a rear plenum. The hot combustion gases are then drawn into a return plenum side of an impeller inlet where the hot combustion gases are mixed with combustion gas emanating from the burner, and such mixture is introduced back into the fan impeller inlet.

U.S. Pat. No. 4,751,915 discloses a gas-fired fryer and gas-fired burner for the fryer. Combustion products are routed from an outlet portion of a conduit, along outer surfaces of an end wall of the frypot, then along outer surfaces of side walls of the frypot. The channels terminate in respective outlets for the combustion products.

U.S. Pat. No. 4,848,318 teaches a cooking apparatus with a frypot for heating cooking oil. An array of flow directing vanes and heat transfer fins are used to increase heat transfer from the combustion gases to the cooking oil.

U.S. Pat. No. 4,913,041 relates to a deep fat frying apparatus having solid insulation material which forms combustion gas heating passages along exterior surfaces of well sections of the frypot. Hot combustion gases are discharged from the burner assembly into a heating cavity, and then into an inlet portion of the heating passage system. The combustion gases continue to flow through the passage system in multiple passes along lateral outwardly facing wall surfaces of the well section, and then flow outwardly through a metal retaining jacket structure into a suitable exhaust header.

U.S. Pat. No. 4,690,127 teaches a catalytic combustion deep fat fryer wherein a heat transfer device is defined by a hollow, elongated heat exchanger having a generally oval, vertical cross-sectional interior configuration, a combustion end portion, and a flue end portion. U-shaped fins are connected with an inner side wall surface of the heat exchanger.

Conventional deep fat fryers and other heating apparatuses, as discussed above, do not teach or suggest a baffle arrangement which is used to direct flue gases in one flow direction, then in a counterflow direction. Such conventional heating apparatuses also do not teach or suggest use of either a power burner or a pulse combustor for generating heat and reducing undesirable emissions, such as nitrogen oxides and carbon monoxide.

SUMMARY OF THE INVENTION

It is one object of this invention to provide a fluid heating apparatus which operates with either a power burner or a pulse combustor.

It is another object of this invention to provide a fluid heating apparatus having a baffle arrangement used to direct flue gas flow along an outside surface of the rear wall, side walls and bottom wall of the fluid container.

It is still another object of this invention to provide a process for heating fluid in a fluid container wherein the flue gases are directed from a plenum, through a passageway formed by a baffle arrangement, and into a flue stack, resulting in increased overall thermal efficiency of the fluid heating apparatus.

A process according to one embodiment of this invention, particularly when used in conjunction with the apparatus of this invention, increases the overall thermal efficiency of the fluid heating apparatus, relative to conventional fluid heating apparatuses, while reducing undesirable emissions. According to the process and apparatus of this invention, particularly when used in conjunction with a deep fat fryer, nitrogen oxides ($NO_x$) emissions are reduced to no more than 10 ppm. Carbon monoxide emissions are also reduced to no more than 4 ppm. Carbon dioxide emissions can be adjusted within a range of about 8 to 12 percent. Flue gases exiting a flue stack of the heating apparatus, are approximately 200° F.–400° F. The overall thermal efficiency of a deep fat fryer according to this invention, is approximately 80–85 percent.

In one preferred embodiment according to this invention, the fluid heating apparatus has a fluid container which is defined by a front wall, a rear wall, side walls and a bottom wall. The fluid heating apparatus is preferably operated with either a power burner or a pulse combustor, either of which includes a combustion tube positioned between the front wall and the rear wall. A front end plate and a rear end plate are secured at opposite ends of the combustion tube. A fuel-air inlet is in communication with the combustion tube and an ignitor is mounted within the combustion tube for igniting the fuel-air mixture.

In a preferred embodiment according to this invention, the fuel-air inlet admits the fuel-air mixture into the combustion tube, along an inner peripheral surface of the combustion tube. In order to maintain fuel-air mixture flow along the inner peripheral surface of the combustion tube, the rear end plate has a plurality of through holes arranged either about its periphery or throughout the rear end plate. In another embodiment, a diffuser is mounted within the combustion tube for maintaining such flow.

A plenum is positioned adjacent the rear wall. The plenum is in communication with the combustion tube. A baffle arrangement forms a passageway for directing flue gases from the plenum, in one flow direction over a primary portion of an outer surface of the fluid container. The baffle arrangement further directs the flue gases in a counterflow direction, with respect to the one flow direction, over a secondary portion of the outer surface. After flowing through the passageway of the baffle arrangement, the flue gases are discharged into a flue stack which is in communication with the passageway and an atmosphere surrounding the fluid heating apparatus.

According to a preferred embodiment of this invention, a process for heating fluid in the fluid container begins with combusting the fuel-air mixture in the combustor tube. The flue gases are then discharged from the combustor tube into the plenum. The flue gases are directed from the plenum through the passageway formed by the baffle arrangement. The flue gases then flow in one direction over the primary portion of the outer surface of the fluid container. The baffle arrangement is configured so that the flue gases then travel in a counterflow direction over the secondary portion of the outer surface. Finally, the flue gases are discharged from the passageway of the baffle arrangement, into the flue stack.

Heat transfer increases when the fuel-air mixture is directed and combusted along the inner peripheral surface of the combustion tube. To further assist and maintain the fuel-air mixture flow along the inner peripheral surface, the rear end plate has a plurality of through holes which are preferably arranged about a periphery of the rear end plate. Such rear end plate periphery has a shape similar to the inner peripheral surface of the combustion tube.

BRIEF DESCRIPTION OF THE DRAWINGS

The above mentioned and other features of this invention and the manner of obtaining them will become more apparent, and the invention itself will be best understood by reference to the following description of specific embodiments taken in conjunction with the drawings, wherein:

FIG. 4 is a partial front view of a fluid heating apparatus, as shown in FIGS. 1 and 3;

FIG. 5 is a perspective view of a combustion tube, according to one embodiment of this invention;

FIG. 5A is a front view of the combustion tube having a diffuser, according to another embodiment of this invention;

DESCRIPTION OF PREFERRED EMBODIMENTS

This invention relates to a general fluid heater and process for heating fluid. However, the apparatus and process of this invention are particularly suitable for a deep fat fryer, which is typically used within kitchen facilities. An inner container or fluid container of the deep fat fryer holds cooking oil or frying oil. The oil is maintained between about 300° F.–400° F., preferably about 340° F.

Figure 1:
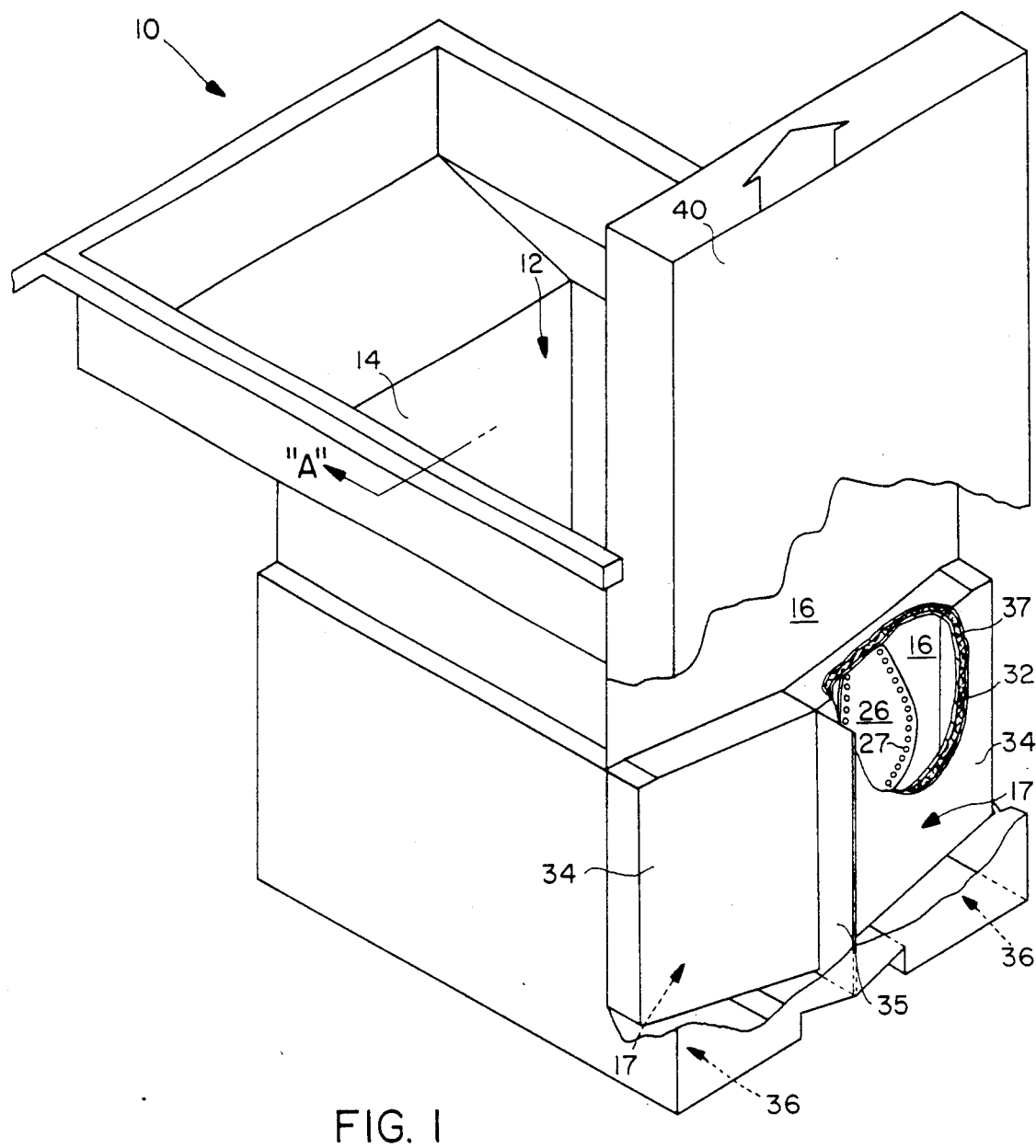
FIG. 1 is a perspective view, with a partial cutaway section, of a fluid heating apparatus, according to one embodiment of this invention.
Figure 1A:
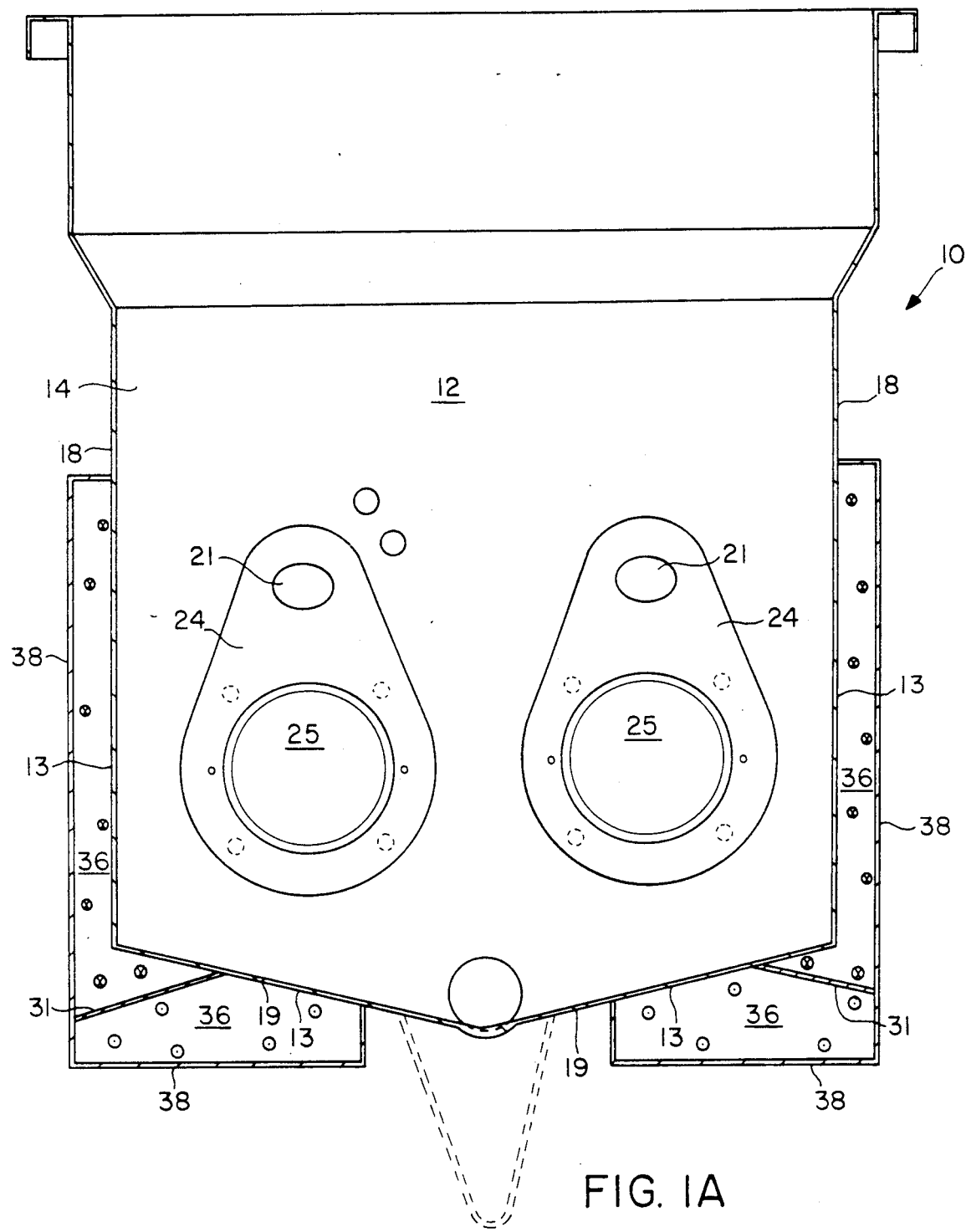
FIG. 1A is a sectional view taken along Section A, as shown in FIG. 1.

FIG. 1 shows a perspective view of fluid heater 10, with a cutaway section to clearly show various components of the apparatus. FIG. 1A is a view taken along section A, as shown in FIG. 1.

Figure 3:
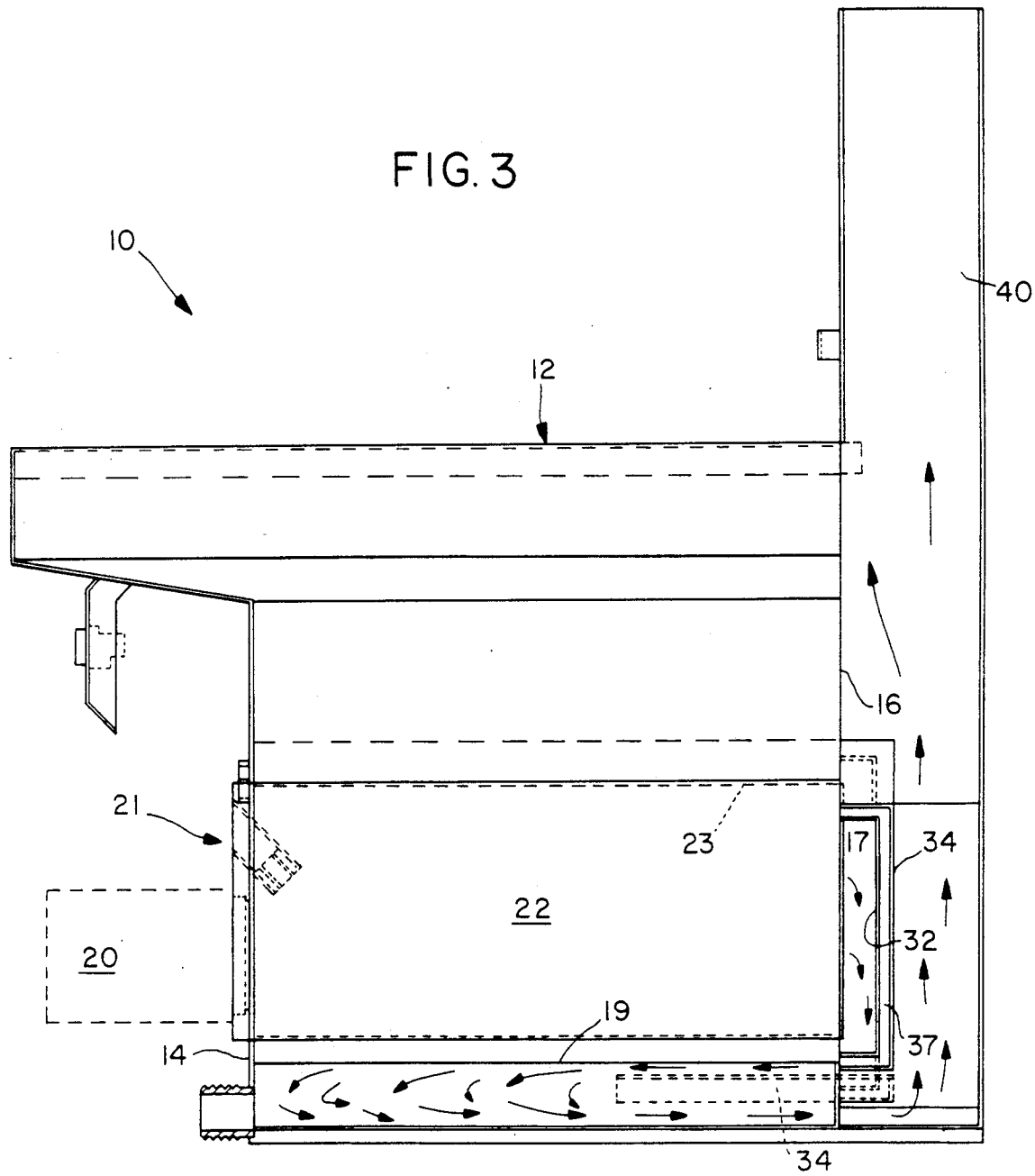
FIG. 3 is a side view of a fluid heating apparatus, as shown in FIG. 1.

In a preferred embodiment according to this invention, fluid heating apparatus 10 comprises fluid container 12, which is defined by front wall 14, rear wall 16, side walls 18 and bottom wall 19. As shown in FIG. 1, fluid container 12 has an open top. However, it is apparent that a top wall is an optional element to fluid container 12, depending upon the particular operating pressure and type of service. The dashed lines in FIG. 1A represent an optional wall that forms a cold well for trapping particles that settle within the cooking oil or frying oil. Fluid container 12 preferably has the shape shown in FIG. 1 but it is also apparent that fluid container 12 can have other various shapes suitable for holding the cooking oil or other fluid. Although combustion tubes 22, as clearly shown in FIG. 3, are shown positioned between front wall 14 and rear wall 16, it is apparent that such combustion tubes 22 can be positioned between side walls 18, or have any other suitable arrangement within fluid container 12.

Figure 7A:
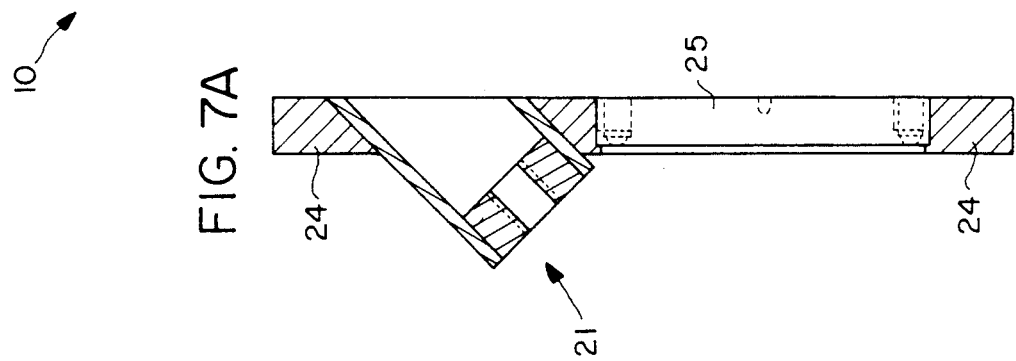
FIG. 7A is a cross-sectional view, taken along line 7A—7A, of the front end plate as shown in FIG. 7.
Figure 7:
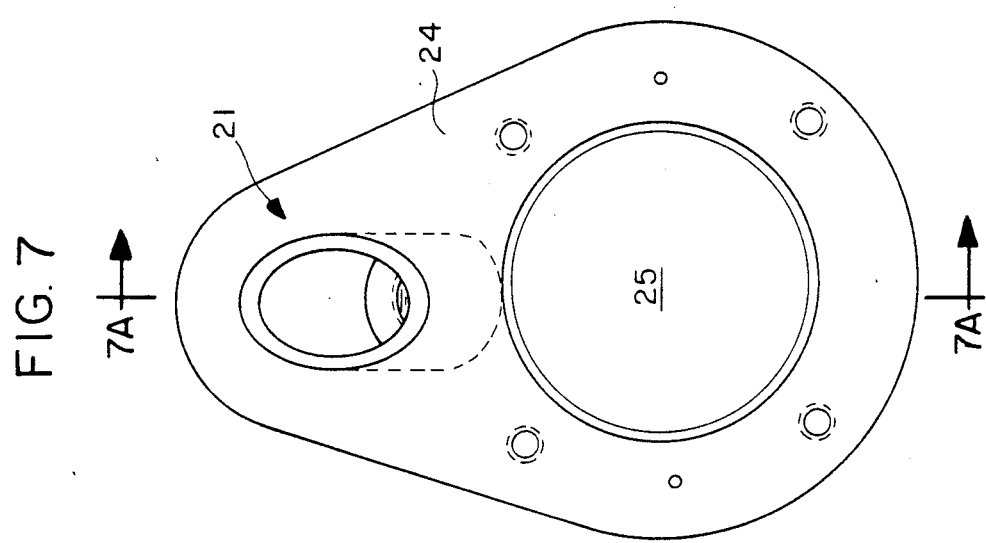
FIG. 7 is a front view of a front end plate according to one embodiment of this invention.

Throughout this specification and in the claims, the term "combustor" or "combustor 20" refers to either a power burner, a pulse combustor, or any other suitable combustion device. One or more combustors 20 are mounted within fluid container 12. Combustor 20 is mounted to front end plate 24 on front wall 14, as generally shown in FIG. 3, and is preferably a sealed system. However, it is apparent that any other suitable unsealed combustor 20, or power burner system, can be mounted to front end plate 24. As shown in FIGS. 1A, 4 and 7, through hole 25 is used to mount combustor 20. Combustor 20 is preferably secured to front end plate 24 so that the housing of combustor 20 is positioned within through hole 25. Each combustor 20 comprises combustion tube 22 sealed at opposing ends by front end plate 24 and rear end plate 26. A fuel-air inlet means is used to admit a fuel-air mixture into a combustion zone within combustion tube 22. It is apparent that such fuel-air inlet means may comprise a single inlet or a separate fuel inlet and a separate air inlet. Other suitable injector devices can be used to admit either a premixed fuel-air mixture or a separate air inlet and fuel inlet can be used to combine fuel and air within combustion tube 22. As shown in FIGS. 7 and 7A, flame sensor means 21 comprises a coupling attached to front end plate 24 about a through hole in front end plate 24. Flame sensor means 21 is used to monitor the flame or combustion within combustion tube 22.

Figure 6A:
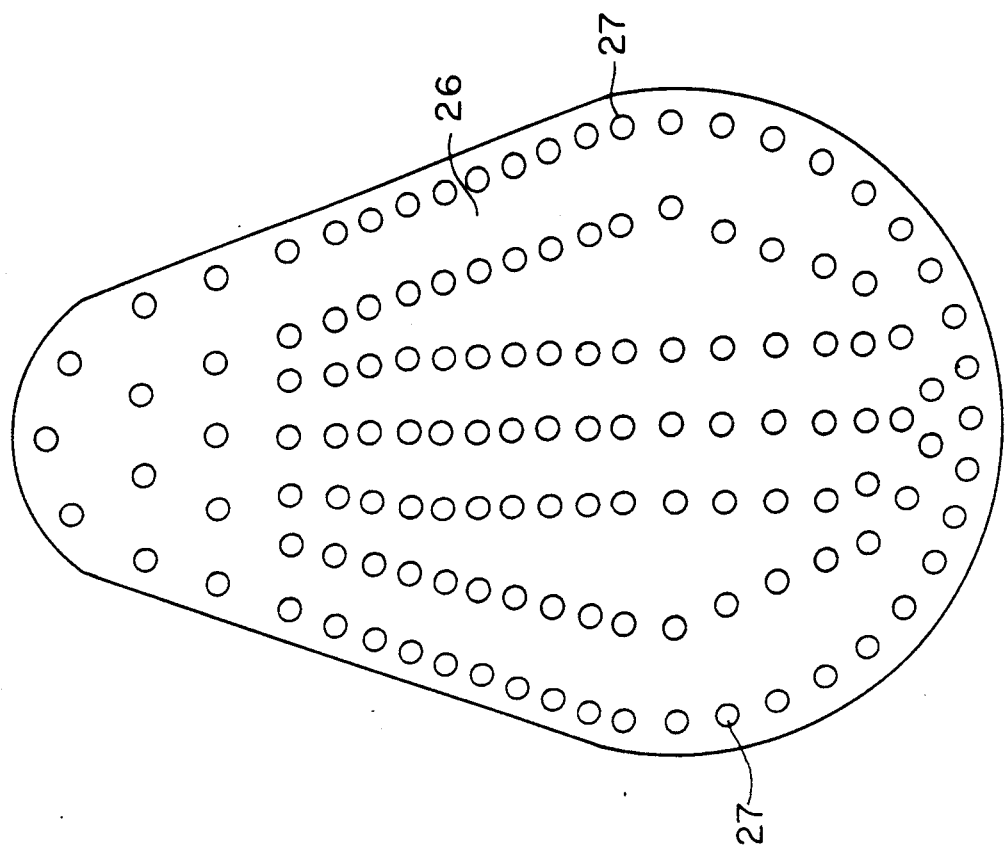
FIG. 6A is a front view of a rear end plate according to another embodiment of this invention.
Figure 6:
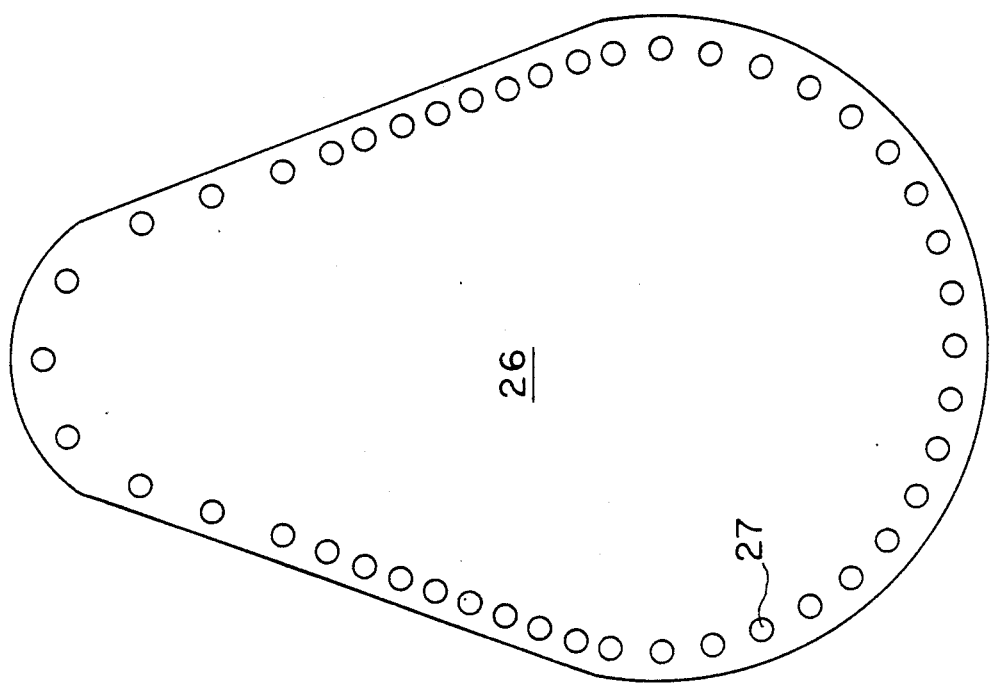
FIG. 6 is a front view of a rear end plate according to one embodiment of this invention.

The fuel-air inlet means is preferably designed to direct the fuel-air mixture along inner peripheral surface 23 of combustion tube 22. It is apparent that a diffusing device, such as diffuser 29 which is shown in FIG. 5A as being mounted within combustion tube 22, can be used to direct the flame from a central portion of combustion tube 22 to an outer portion of combustion tube 22, or inner peripheral surface 23 of combustion tube 22. Diffuser 29, or another similar device, can be of any suitable material, such as a porous material. Directing and combusting the fuel-air mixture along inner peripheral surface 23 provides increased heat transfer from the flue gases, through combustion tube 22 and into the cooking oil or other fluid. To further ensure that the fuel-air mixture is directed and combusted along inner peripheral surface 23, rear end plate 26 preferably has discharge means comprising a plurality of through holes 27 arranged about a portion of a periphery of rear end plate 26, as shown in FIG. 6.

A power burner having similar components to those preferred for use in the apparatus and process of this invention are described in U.S. Pat. No. 4,780,076, the teachings of which are incorporated into this specification by reference. A pulse combustor having similar components to those preferred for use in the apparatus and process of this invention are described in U.S. Pat. Nos. 4,671,712 and 4,637,792, the teachings of which are incorporated into this specification by reference.

Figure 2A:
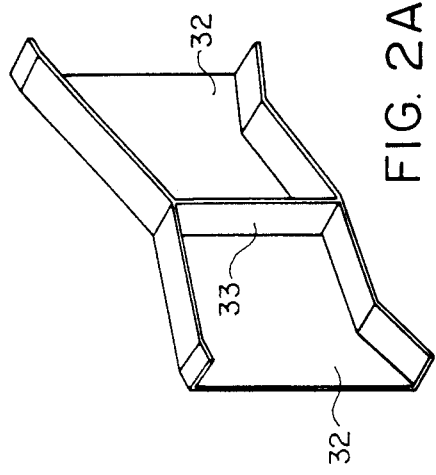
FIG. 2A is a perspective view of an inner baffle according to one embodiment of this invention.

Plenum 17 is formed by plenum walls of inner baffle 32, which are mounted adjacent rear wall 16. Plenum 17 is in communication with combustion tube 22, via through holes 27. It is apparent that one or more plenums 17 can be used to accept flue gases from combustion tube 22. Inner baffle 32 shown in FIG. 2A is mounted adjacent rear wall 16 and inner divider wall 33 forms two separate plenums 17, which accept flue gases from two combustors 20.

In one preferred embodiment according to this invention, a baffle means includes inner baffle 32 mounted within outer baffle 34, thus forming passageway 36 through which the flue gases flow. The baffle means is used to direct the flue gases from plenum 17 in one flow direction over a primary portion of outer surface 13 of fluid container 12. Passageway walls 38, as shown in FIG. 1A, also define passageway 36. The baffle means is used to then direct the flue gas flow in a counterflow direction, with respect to the one flow direction, over a secondary portion of outer surface 13. It is apparent that the primary portion and secondary portion of outer surface 13 may comprise various configurations and surface areas of either front wall 14, rear wall 16, side wall 18 and/or bottom wall 19. It is an important aspect of this invention to direct the relatively hot flue gases over enough surface area of outer surface 13 to effectively transfer heat to the fluid within fluid container 12, and thereby reduce the flue gas temperature within flue stack 40. Passageway walls 38 preferably have inwardly directed dimples for increasing heat transfer from the flue gases. It is apparent that other heat transfer surfaces of the components of this invention, for example, inner peripheral surface 23, can also have dimples appropriately positioned for increased heat transfer.

Figure 2C:
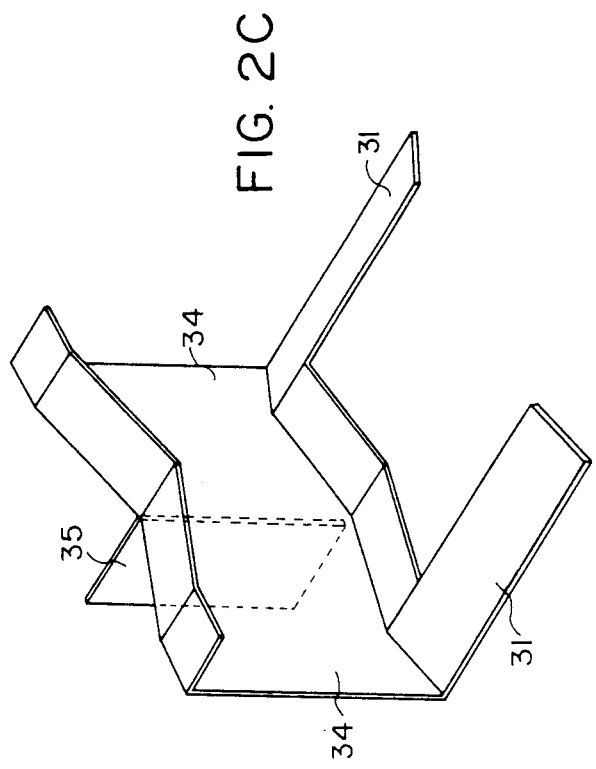
FIG. 2C is a perspective view of the outer baffle according to one embodiment of this invention.
Figure 2B:
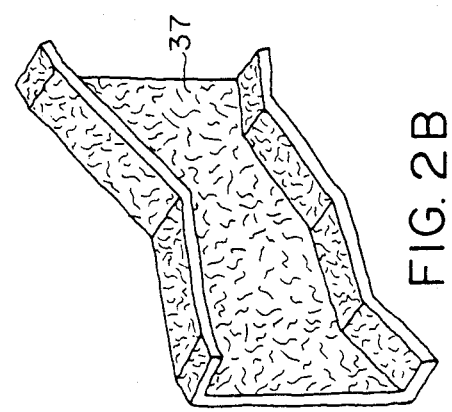
FIG. 2B is a perspective view of an insulation layer which is positioned between the inner baffle and an outer baffle, according to one embodiment of this invention.
Figure 2:
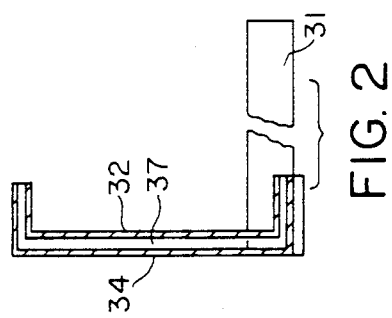
FIG. 2 is a side view of an inner baffle, insulation and outer baffle arrangement, according to one embodiment of this invention as shown in FIG. 1.

Insulation 37, as shown in FIGS. 1 and 2B, is preferably positioned between inner baffle 32 and outer baffle 34. Insulation 37 reduces heat transfer through inner baffle 32 and outer baffle 34 so that there is more heat transfer to fluid container 12.

Flue stack 40 is mounted on the rear portion of heating apparatus 10, preferably adjacent rear wall 16. Flue stack 40 is in communication with passageway 36 and a surrounding atmosphere. As shown in FIGS. 1 and 2C, outer divider wall 35 is an optional element that can be used to maintain separated flue gas flow entering flue stack 40. It is apparent that flue stack 40 can exhaust to ambient air or another suitable vapor recovery system.

In another preferred embodiment according to this invention, a control means is used to control the heat output of combustor 20. The control means may comprise at least one temperature sensor in thermal communication with the fluid within fluid container 12. Each temperature sensor emits a signal which is received by a computer means for controlling admission of the fuel-air mixture into combustion tube 22. In another embodiment of this invention, the control means comprises a control valve which responds to a mechanical thermostat. Other means for adjusting the heat output are apparent to those persons skilled in the art.

The process for heating fluid in a fluid container begins with combusting the fuel-air mixture in combustion tube 22. To increase heat transfer and assist in reduction of the undesirable emissions, the fuel-air mixture is introduced into combustion tube 22 along inner peripheral surface 23. A plurality of through holes 27, preferably arranged about a periphery of rear end plate 26, as shown in FIG. 6, also maintains the flow and combustion of the fuel-air mixture along inner peripheral surface 23. It is apparent that rear end plate 26 can have through holes 27 arranged throughout the center portion of rear end plate 26, as shown in FIG. 6A. However, the peripheral flow arrangement is preferred for increasing heat transfer and reducing the undesirable emissions.

Figure 8:
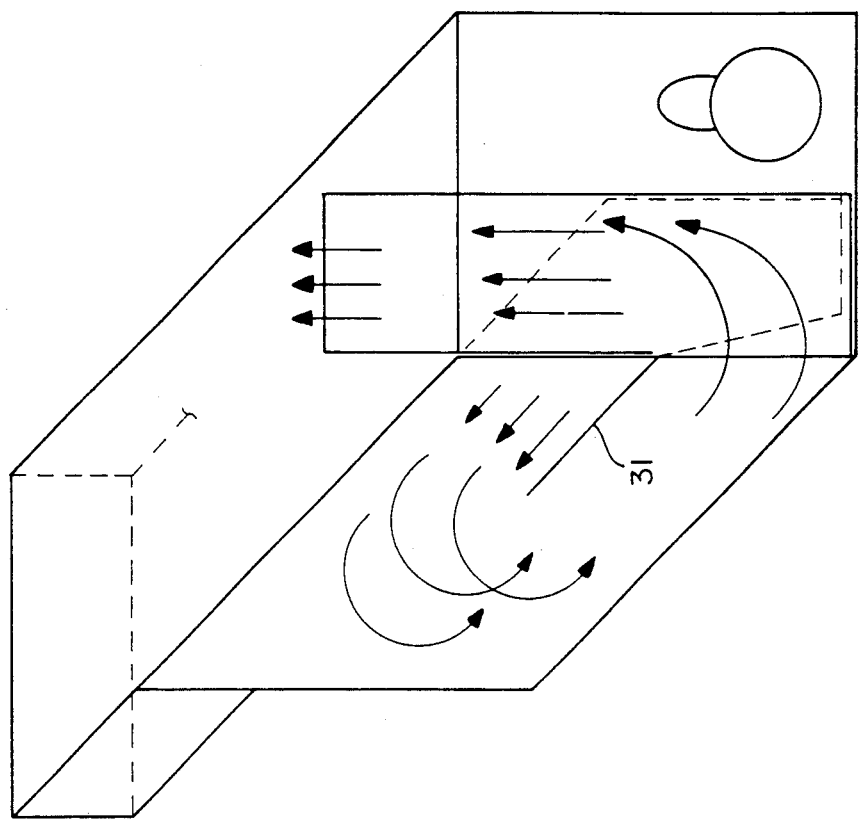
FIG. 8 is a diagrammatic sketch showing general flow patterns of the flue gases through a passageway formed by a baffle arrangement and a flue stack, according to one embodiment of this invention.

Preferred flue gas flow is diagrammatically illustrated in FIG. 8. The flue gases are discharged from combustion tube 22 into each plenum 17. Passageway walls 38 and baffle walls 31 are used to direct the flue gases from plenum 17 through passageway 36, which is routed along a primary portion defined by side walls 18 and a portion of bottom wall 19. The flue gases flow in one direction over the primary portion of outer surface 13 of fluid container 12, as shown in FIG. 1A by a circled "x". The flue gases are then directed in a counterflow direction, with respect to the one flow direction, over a secondary portion of outer surface 13, as shown in FIG. 1A by a circled dot.

Throughout this specification and in the claims, the term "counterflow" is intended to relate to the flue gas flowing in one continuous downstream direction along passageway 36, and to relate to the flue gas flowing through turns or bends defined by the baffle means, so that the flue gas can flow in different directions, relative to fixed directional headings of outer surface 13, throughout the baffle arrangement. Such term "counterflow" as used throughout this specification and the claims is specifically intended to not relate to reversal of the flue gas flow within passageway 36, such as shifting downstream flow to upstream flow, or backflow, within the same stretch of passageway 36.

It is apparent that the flue gases can be directed in any other effective and suitable route along front wall 14, rear wall 16, side wall 18 and/or bottom wall 19. The routing of passageway 36, defined by wall 31 and passageway walls 38, according to the embodiment shown in the drawings, has proven to effectively transfer heat from the flue gases to fluid container 12. However, it is apparent that other configurations of the primary portion, secondary portion, and possibly additional portions of outer surface 13, as well as other flow directions may prove as effective or more effective than the specific arrangement shown in the drawings and/or described in the specification and claims. Furthermore, the specific configuration described in the specification and shown in the drawings also enhances reduction of nitrogen oxides emissions to not more than 10 ppm and carbon monoxide emissions to not more than 4 ppm.

After the flue gases have passed through the defined configuration of passageway 36, the flue gases enter flue stack 40. Due to the increased heat transfer resulting from routing the flue gases about outer surface 13, the flue gas temperature is in the range from approximately 200° F.–400° F., which is significantly less than typical conventional flue stacks which, for deep fat fryer applications, operate at approximately 1300° F.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein, particularly the baffle arrangement, can be varied considerably without departing from the basic principles of the invention.

What is claimed is:

1. A fluid heating apparatus comprising:
   a fluid container having a front wall, a rear wall, side walls and a bottom wall;
   at least one combustor each comprising a combustion tube positioned between said front wall and said rear wall, a front end plate and a rear end plate, fuel-air inlet means for admitting a fuel-air mixture into said combustion tube, ignition means for igniting said fuel-air mixture, and said rear end plate having a plurality of through holes about at least a portion of a periphery of said rear end plate;
   a plenum adjacent said rear wall, said plenum in communication with each said combustion tube;
   baffle means forming a passageway for directing flue gases from said plenum in a flow over a primary portion of an outer surface of said fluid container and then in a counterflow, with respect to said flow, over a secondary portion of said outer surface; and
   a flue stack in communication with said passageway and a surrounding atmosphere.

2. A fluid heating apparatus according to claim 1 wherein said fuel-air inlet means directs said fuel-air mixture along an inner peripheral surface of said combustion tube.

3. A fluid heating apparatus according to claim 1 further comprising control means for controlling heat output of said combustor.

4. A fluid heating apparatus according to claim 3 wherein said control means further comprises at least one temperature sensor in thermal communication with fluid within said fluid container, and each said temperature sensor emitting a signal received by computer means for controlling admission of a fuel-air mixture into said combustion tube.

5. A fluid heating apparatus according to claim 1 wherein said baffle means further comprises baffle walls and an inner side of at least a portion of said baffle walls has inwardly directed dimples.

6. A fluid heating apparatus comprising:
   a fluid container having a front wall, a rear wall, side walls and a bottom wall;
   at least one combustor each comprising a combustion tube positioned between said front wall and said rear wall;
   a plenum adjacent said rear wall, said plenum in communication with each said combustion tube;
   baffle means forming a passageway for directing flue gases from said plenum in a flow over a primary portion of an outer surface of said fluid container and then in a counterflow, with respect to said flow, over a secondary portion of said outer surface, said baffle means comprising an inner baffle mounted within an outer baffle forming a passageway through which said flue gases flow over said rear wall, along at least a side wall portion of said side walls and then counterflow along at least a bottom wall portion of said bottom wall; and
   a flue stack in communication with said passageway and a surrounding atmosphere.

7. A fluid heating apparatus according to claim 6 further comprising insulation positioned between said outer baffle and said inner baffle.

8. A process for heating fluid in a fluid container comprising the steps of:
   (a) combusting a fuel-air mixture in a combustion tube or a combustor;
   (b) discharging flue gases from the combustion tube into a plenum;
   (c) directing the flue gases from the plenum through a passageway formed by baffle means;
   (d) passing the flue gases in a flow direction over a primary portion of an outer surface of the fluid container;
   (e) passing the flue gases in a counterflow direction, with respect to the flow direction, over a secondary portion of the outer surface; and
   (f) discharging the flue gases from the passageway into a flue stack through a plurality of through holes arranged about a periphery of a rear end plate of the combustor.

9. A process according to claim 8 further comprising the step of directing and combusting the fuel-air mixture along an inner peripheral surface of the combustion tube.

10. A process according to claim 8 wherein the flue gases within the flue stack are at a temperature of about 200° F. to about 400° F.

11. A process according to claim 8 wherein the flue gases within the flue stack contain only as much as 10 ppm of nitrogen oxides.

12. A process according to claim 8 wherein the flue gases within the flue stack contain only as much as 4 ppm of carbon monoxide.

13. A process according to claim 9 having an overall thermal efficiency of about 80% to about 85%.

* * * * *